United States Patent
Goodspeed

[11] Patent Number: 5,310,202
[45] Date of Patent: May 10, 1994

[54] SKATEBOARD

[76] Inventor: Byron L. Goodspeed, 203 White Rd., Castle Rock, Wash. 98611

[21] Appl. No.: 883,557

[22] Filed: May 15, 1992

[51] Int. Cl.⁵ .................. A63C 17/12; B62M 1/04
[52] U.S. Cl. .................. 280/221; 280/11.115; 280/254; 280/87.042
[58] Field of Search .......... 280/221, 11.115, 87.042, 280/245, 254

[56] References Cited
U.S. PATENT DOCUMENTS

| | | | |
|---|---|---|---|
| 525,270 | 8/1894 | Kitchen | 280/11.115 |
| 3,285,618 | 11/1966 | Welch | 280/11.115 |
| 3,399,906 | 9/1968 | Portnoff | 280/221 |
| 3,415,540 | 12/1968 | Portnoff | 280/221 |
| 4,411,442 | 10/1983 | Rills | 280/221 |
| 4,602,801 | 7/1986 | Vincent | 280/11.115 |
| 4,861,054 | 8/1989 | Spital et al. | 280/221 |
| 4,915,403 | 4/1990 | Wild et al. | 280/87.042 |

FOREIGN PATENT DOCUMENTS

| | | | |
|---|---|---|---|
| 3730839 | 3/1989 | Fed. Rep. of Germany | 280/11.115 |
| 537079 | 2/1922 | France | 280/11.115 |
| 297879 | 4/1954 | Switzerland | 280/11.115 |

*Primary Examiner*—David M. Mitchell
*Attorney, Agent, or Firm*—Dellett and Walters

[57] ABSTRACT

A skateboard is provided with a low profile and a simplified mechanism for driving the same without interfering with skateboard steering. A narrow drive belt is entrained about a centrally located pulley integrally mounted on a shaft carrying forward wheels including an overrunning clutch mechanism. A pedal mounted on the front of the board drives a horizontally displaceable rack via an intermediate cam member which provides a variable velocity. The rack in turn drives pinions operative for winding the drive belt around a pulley against spring tension applied at the remote end of the belt. The belt may also be entrained about a rear wheel pulley for empowering the rear wheels of the board.

14 Claims, 5 Drawing Sheets

SKATEBOARD

CROSS-REFERENCE TO RELATED APPLICATION

This application is related to application Ser. No. 07/883,558, entitled SKATEBOARD, and filed concurrently herewith now U.S. Pat. No. 5,224,719, issued Jul. 6, 1993.

FIELD OF THE INVENTION

The present invention relates generally to vehicles propelled by the rider of the vehicle and more particularly to a skateboard having an actuable pedal for propelling the same.

BACKGROUND OF THE INVENTION

Skateboard riders propel their skateboards, at least on flat or uphill surfaces, by assuming a pushing stance in order to thrust against the ground with one foot while the other foot is positioned on the board. Then, while coasting and maneuvering, a skateboarder places both feet on the board deck in a riding stance, facing sideways relative to the movement of the skateboard, one foot on a front portion of the board and the other foot at the rear. Steering of the skateboard is typically accomplished by the rider leaning laterally with respect to the direction of travel to one side or the other in order to tilt the board. The tilt is converted into a corresponding change of direction of the wheels via front and rear steering trucks. Conventional steering trucks have an axle fixed thereto with wheels mounted for rotation in fixed planes perpendicular to the axle, and employ steering axes diagonally positioned in opposing directions with respect to the vertical (i.e., with the steering axis of one truck angled forwardly and the steering axis of the other truck angled rearwardly) whereby lateral tilting relative to the axles causes the trucks to rotate and steer in the desired direction.

Disadvantages associated with the conventional method of propulsion on flat ground include the fact that additional speed or propulsion is achieved by temporarily leaving the riding stance with two feet on the board to assume the pushing stance with one foot on the board and one foot on the ground. The speeds attainable with such a method are limited. This and other factors have led to efforts at developing pedal-powered skateboards directed toward avoiding the need for alternating between conventional riding and pushing positions.

One prior skateboard as described in U.S. Pat. No. 4,915,403 employs an actuable pedal hinged to the chassis of the skateboard near the middle of the board such that the pedal inclines upwardly from the hinge, the pedal comprising the rear half of the board. During propulsion and riding, one of the rider's feet is positioned on the front portion of the board while the remaining foot presses the actuable pedal downwardly. The motion of pushing the actuable pedal downwardly is transmitted to drive wheels having an overrunning clutch via an elastically mounted push rod used to drive a gear train mounted under the board. The pedal is returned to an elevated position ready for the next stroke by a spring. Though steering of such a board is accomplished according to somewhat conventional diagonal steering axis means, a modified rear truck is required.

Another prior skateboard as set forth in U.S. Pat. No. 4,861,054 uses a pair of actuable pedals, one pedal for each of the rider's feet, wherein each pedal comprises one half of the board surface. The pedals of such skateboard are pivoted to a chassis, and propulsion is accomplished by pushing either or both of the pedals downwardly. Separate push rods for each pedal, drive gears, chain loops and sprockets mounted on shafts in a power transmission train are employed in order to impart rotational motion to a drive wheel. Once the rider's weight has been removed from either or both of the pedals, a spring return system counter-rotates the gears on overrunning clutch bearings to return the pedal or pedals to a ready position. Steering is accomplished by tilting the board from side-to-side, as with conventional boards, but unlike conventional boards the tilting of the board is translated into independent turning of front wheels through a system of steering rods and a rocking pendulum.

An alternative embodiment of the dual pedal propulsion skateboard described in U.S. Pat. No. 4,861,054 employs a relatively wide drive belt running over a system of rollers, the drive belt being fixed near its middle to a center piece of the board and at each end to front and rear drive sleeves that retain one-way clutches for engaging the front and rear wheel axles. Upon depressing, for example, the front pedal, a roller rotatably fixed to the pedal pulls the front portion of the drive belt over other rollers so that the drive belt unwinds from the front drive sleeve causing the front axle to turn drive wheels mounted on the axle. Upon release, the pedal is returned to an elevated position by a spring on the axle whereby the drive belt biases the pedal upwardly as the drive belt rewinds around the drive sleeve. Steering with this embodiment of the dual pedal propulsion skateboard is accomplished in a somewhat conventional manner.

One problem faced by the prior skateboards has been the accommodation of steering or turning and simultaneous propulsion of the wheels by pedal action. That is, there is difficulty in simply and effectively integrating a suitable propulsion system with an advantageous method of steering without producing an unwieldy or expensive board. Preferred conventional steering trucks fixed to the underside of the board have been replaced by complicated, bulky, and perhaps less stable or less efficient steering systems employing special linkages, steering rods, and swinging pendulums, or propulsion systems have been utilized which are difficult to manufacture or which heighten the profile of the board, leading to instability. Maneuverability has also been a problem.

Another problem, unrecognized by the skateboards described above, is that depression of a single pedal or one of a pair of pedals comprising a rear portion of the board requires the rider to lean in a direction opposite the intended direction of travel of the board in order to supply the weight or force necessary. That is, with such boards, the motion of the rider is in a direction opposite that of the board and very unstable riding conditions can result. Thus, the board tends to "shoot out" from under the rider, especially when first starting to pedal the board.

Still another problem relates to the maximization of propulsion to permit acceleration without unduly elevating the board or inclining the pedal or pedals as would create an awkward or potentially unsafe or unstable riding condition. Attempts to deal with this problem have sometimes resulted in unduly bulky vehicles not closely resembling conventionally popular skateboards. Furthermore, some pedal-propelled skateboards have involved such a departure from conventional skateboards that converting a conventional skateboard to a pedal-propelled skateboard (e.g. with a kit) is not easily accomplished.

SUMMARY OF THE INVENTION

In accordance with the present invention, a skateboard comprises an elongated deck, a pedal mounted to the deck and pivotable between a first ready position and a second depressed position, at least one drive wheel mounted to the underside of the deck and which includes an overrunning clutch bearing, a linearly reciprocable rack that is movable substantially horizontally between a ready and a driven position and which is operably connected between the pedal and the drive wheel such that depression of the pedal provides rotational movement for propelling the skateboard, and a spring return means for biasing the linearly reciprocable rack and pedal toward the ready positions.

The invention is directed to a more efficient resolution of the problems associated with conventional propulsion that have required repositioning between pushing and riding stances. Additional speed of propulsion of the skateboard is achieved by depressing a pedal of the skateboard without the awkwardness of having to change between pushing and riding positions.

Unlike prior pedal-operated skateboards, the skateboard according to the present invention operates in harmony with conventional steering trucks, provided with diagonal steering axes, without the necessity of unduly complicated linkages between the transmission of the skateboard and the drive wheel or wheels. Accordingly the bulk, weight and height of the skateboard are minimized, and maneuverability of the skateboard is improved.

In accordance with an aspect of the present invention, at least one of a pair of steering trucks disposed in supporting relation to the skateboard includes a central drive pulley about which a narrow drive belt is entrained for propelling the skateboard forwardly without interference with the steering function of the truck. Thus, the truck can be turned to the right or to the left without any appreciable repositioning of the drive belt. The steering truck suitably includes a bifurcated bracket member supporting spaced bearings within which the drive wheel shaft turns, and the belt driven pulley wheel is disposed on the same shaft between the spaced bearings. The same construction can be employed at both ends of the skateboard, i.e., front and rear, with the same drive belt extending in drive relation to pulleys mounted on the shaft of the forward steering truck and on the shaft of the rearward steering truck.

In accordance with another aspect of the invention, the skateboard pedal depresses forwardly with respect to the normal forward motion of the skateboard. Thus, the lean and motion of the rider's body necessary to depress the pedal with the rider's foot is in the same direction as the motion of the skateboard. Accordingly, the unstable riding condition which often results from depressing a rearwardly positioned pedal on a skateboard, which requires leaning backwardly with respect to the forward motion of the skateboard, is eliminated, and thus the tendency of the skateboard to "shoot out" from under the rider is minimized.

In accordance with another aspect of the invention, transmission of power is accomplished by the depression of the pedal, operating pedal rollers carried on a rack having horizontally disposed and interconnected members that linearly slide within tracks provided on frame side members mounted to the underside of the skateboard deck. Teeth on the rack members drive a pair of pinions fixedly mounted to a shaft which rotates a central pulley. The central pulley is employed for driving a belt for engaging drive pulleys on one or both of the steering trucks.

Power transmission is accommodated in a skateboard of relatively low profile inasmuch as the mechanism is substantially no greater in height than a conventional steering truck utilized to support the board. As a consequence, stability in riding the skateboard is enhanced in addition to maneuverability. The drive mechanism is comparatively simple in construction and therefore inexpensive to build.

In accordance with another aspect of the invention, cam members are disposed between pedal rollers and the aforementioned rack, each cam member having a shape and being positioned such that additional velocity is imparted to the rack toward the bottom of each pedal stroke. Thus, higher speeds may be attained during riding of the board than initially experienced when starting out. During higher speed riding, only a small pedal stroke is required to maintain speed, i.e., as the pedal is operated more closely to the skateboard deck. In effect, this provides a variable range of speed outputs along the cam surface similar to that provided by shifting gears in a powered vehicle.

It is accordingly an object of the present invention to provide an improved pedal-powered skateboard which overcomes many of the problems associated with prior skateboards, and particularly problems relating to integration of power transmission and steering, and maximization of propulsion and stability.

It is another object of the present invention to provide an improved pedal-powered skateboard adaptable for use with conventional steering trucks and which does not unduly alter their maneuverability, handling or transportability.

It is another object of the present invention to provide an improved pedal-powered skateboard having a low profile and a simplified operating mechanism that does not interfere with skateboard steering.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE DRAWINGS

Referring to FIGS. 1-7, a preferred embodiment of a pedal powered skateboard 10 in accordance with the present invention has a deck 12 with a pair of free-spinning rear wheels 14 mounted on a diagonal axis, rear steering truck 16 attached to the underside of the deck. A pair of front drive wheels 20 is similarly mounted on a diagonal axis, front steering truck 22 secured to the underside of deck 12. Each of the steering trucks is pivotable about an aforementioned diagonal axis on a sleeve 24 rotatably received on a stud 26 extending diagonally downwardly toward the center of the board from plate 28 forming part of frame 30. Sleeve 24 supports wheel bracket 32 against which restraining elastomeric (rubber or plastic) member 34 bears for the purpose of limiting the degree to which a bracket 32 may rotate with respect to stud 26.

Steering of the skateboard may be accomplished in a conventional manner, that is, as the rider of the board leans to one side or the other with respect to forward motion of the board, wheel pairs 14 and 20 pivot in opposing directions about the diagonal steering axes defined by studs 26. The wheel trucks turn toward the direction in which the rider leans.

The skateboard in accordance with the present invention is provided proximate the forward end thereof with a tiltable pedal 36 which pivots about the horizontal axis of pin 40 forming part of a hinge with horizontal plate 38 secured through board 10 to frame 30. The board has an upper tread area 18. Depending side members of pedal 36 form a lower lever portion 42 receivable through aperture 44 in the forward upper part of the deck. The lever portion is provided toward its rearward end with rollers 48 adapted for engaging transmission means 50 described in further detail below. The transmission means is positioned beneath the level of deck 12 and is adapted for translating reciprocating pedaling motion to rotation of forward wheels 20 in accordance with the preferred embodiment of the invention, as well as rear wheels 14 in accordance with an alternative embodiment.

Figure 1:
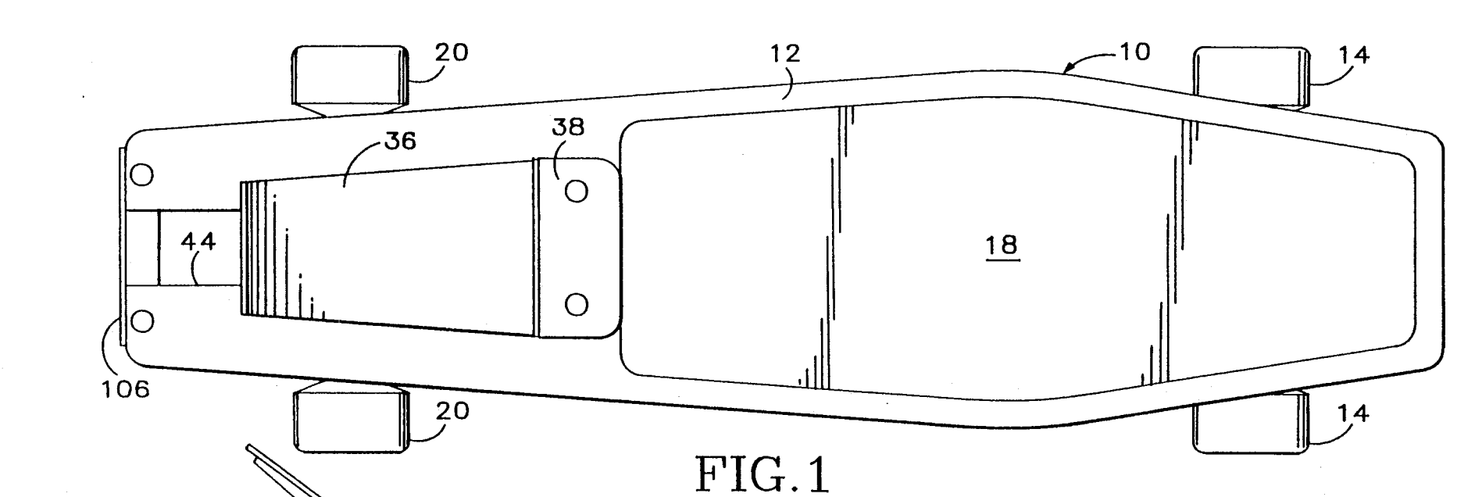
FIG. 1 is a top view of a pedal-powered skateboard in accordance with the preferred embodiment of the present invention.
Figure 2:
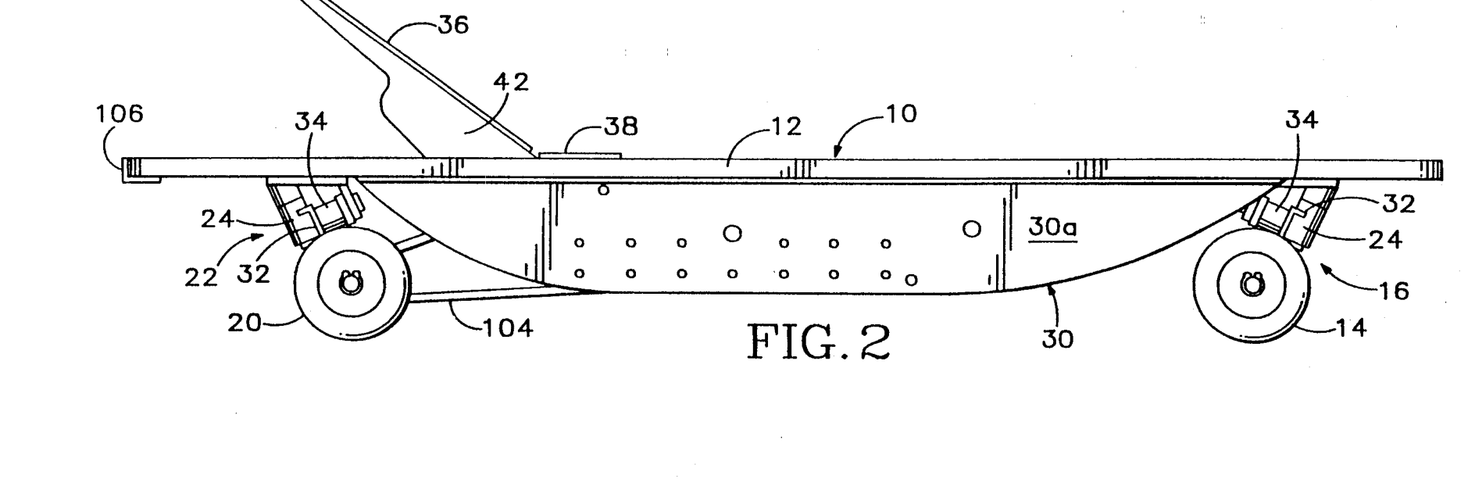
FIG. 2 is side view of the FIG. 1 skateboard showing steering trucks.
Figure 3:
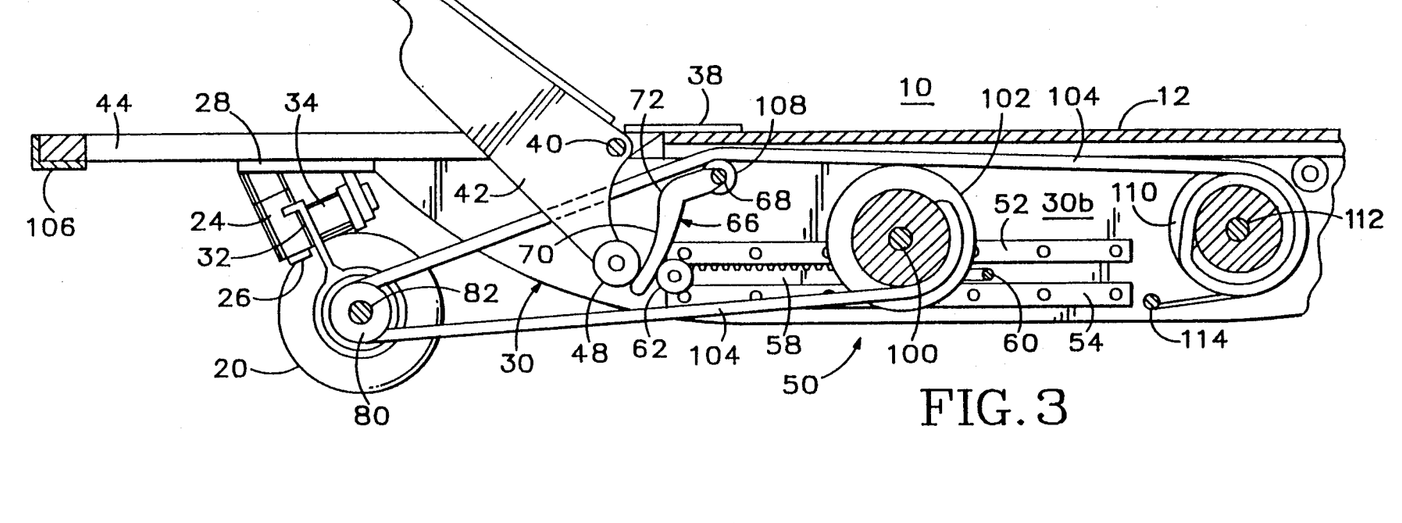
FIG. 3 is a partially broken away, longitudinally vertical cross section of the skateboard according to the present invention.
Figure 4:
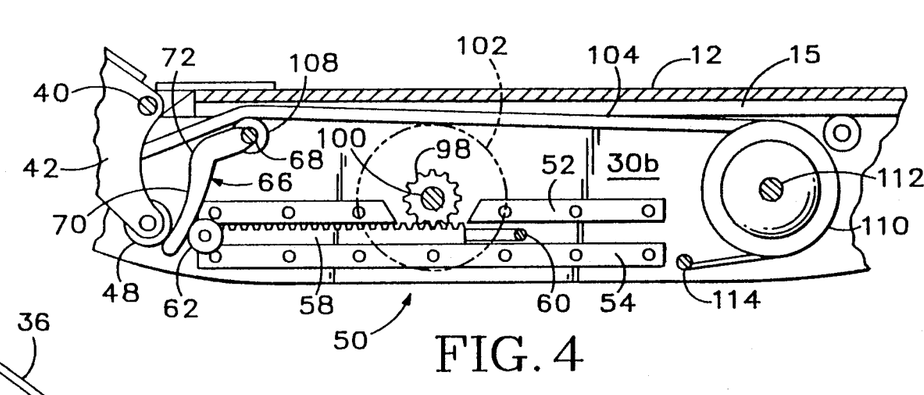
FIG. 4 is further broken away cross sectional view showing a drive pulley in phantom for revealing a rack operated pinion therebehind.
Figure 5:
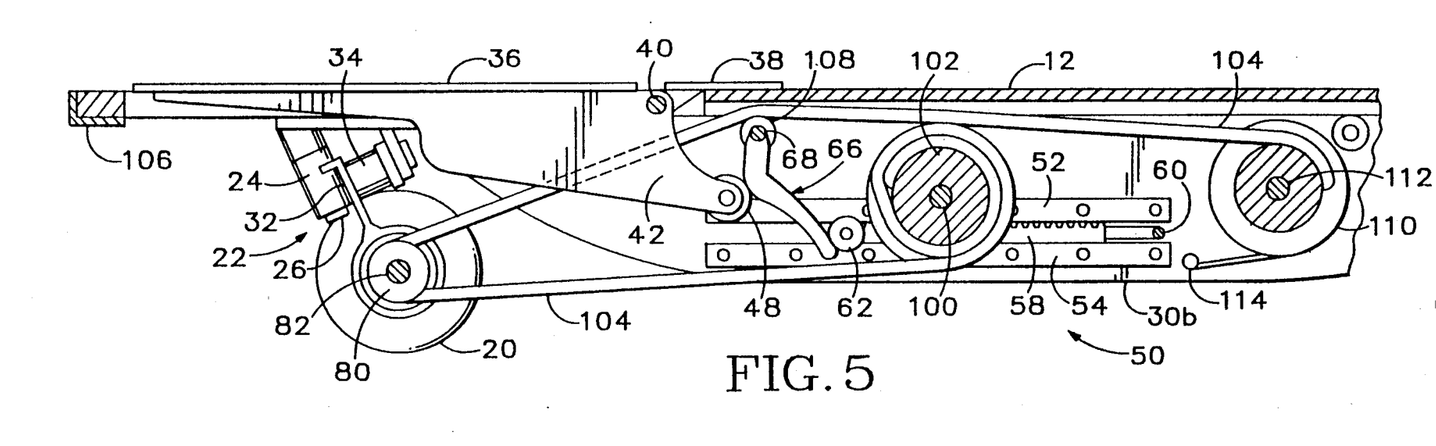
FIG. 5 is a partially broken away, longitudinally vertical cross section showing the skateboard pedal in a depressed position.
Figure 6:
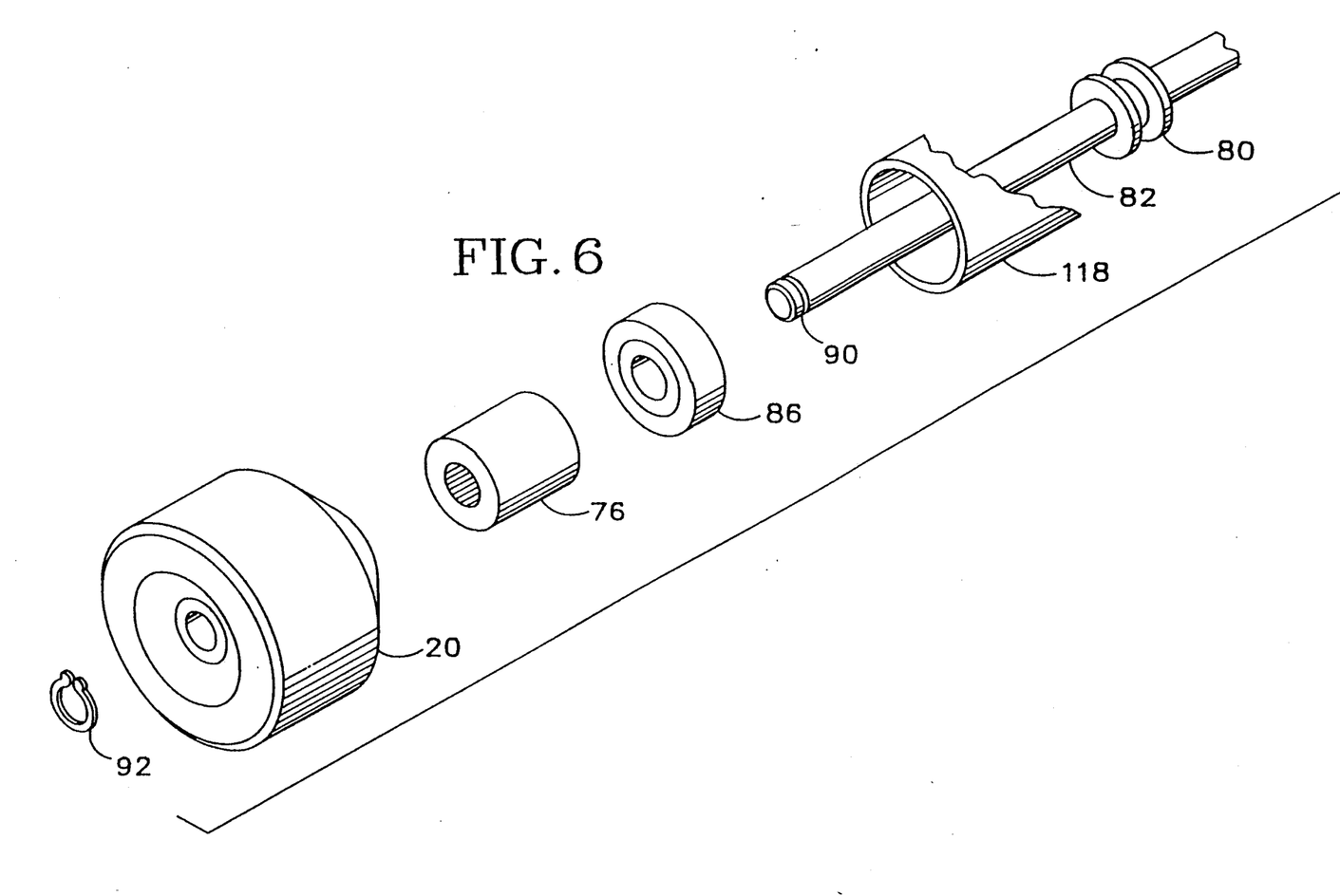
FIG. 6 is an exploded view of a drive wheel assembly.

Referring to FIG. 6, a drive wheel assembly is shown in exploded fashion. Although only one of the front drive wheels 20 at one side of the front steering truck 22 is shown, FIG. 6 is representative of both forward wheels since both wheels are typically driven and the construction is symmetrical about a vertical plane through the lateral center of the truck. The drive wheel assembly includes drive wheel 20 which receives overrunning clutch member 76 in engaging relation thereto, e.g. pressed into the inner portion of the drive wheel. Overrunning clutch member 76 in turn receives shaft member 82. The assembly further includes shaft bearing 86, and retainer 92 positionable in groove 90 at the end of shaft member 82 for holding wheel 20 in place adjacent bearing 86. Bearing 86 is supported by tubular housing 118, and a central drive pulley 80 is integral with shaft member 82. As understood by those skilled in the art, clutch member 76 engages shaft member 82 as the shaft rotation in a first direction (corresponding to forward movement of the board) tends to exceed that of wheel 20.

Transmission means 50 is located between parallel, downwardly extending sides 30a and 30b of the frame 30 which is secured to the underside of deck 12. The frame sides 30a and 30b each carry horizontal, parallel blocks 52 and 54 providing tracks therebetween for receiving sides of a double rack comprising left and right toothed bars 58 spaced apart by member 60 at the rear end of the double rack. The rack is adapted to slide within the tracks in a horizontal direction as cam members 66 bear against rollers 62 respectively attached to the forward ends of the toothed bars. The cam members 66 depend from a pivot shaft 68 and are provided with a frontward facing depression 70, as well as a forward lobe 72 between the depression and pivot shaft 68. The rollers 48, attached to portion 42 of pedal 36 via shaft 56, are adapted to bear against and ride upwardly along the forward faces of the cam members 66 as the pedal is depressed, causing the cam members to bear against rollers 62 for urging the double rack in a rearward direction. The cam members are rotated first slowly and then more rapidly as rollers 48 reach lobes 72, as hereinafter more fully discussed, resulting in acceleration of the double rack in a rearward direction as the pedal 36 is depressed toward a horizontal position substantially in line with deck 12.

The upwardly facing teeth on the rack bars 58 engage pinions 98 mounted on shaft 100 extending between frame sides 30a and 30b, the shaft being further provided with an integral, central drive wheel or pulley 102. Blocks 52 are discontinuous approximately halfway therealong so that pinions 98 may engage the rack teeth. Belt 104 is suitably formed of rubber or similar material and suitably comprises a V-belt having a width of approximately one-half inch or less.

One end of a narrow belt 104 is attached to the grooved periphery of the pulley such that, when pulley 102 rotates in a counterclockwise direction as driven by bars 58, the belt 104 is wound further onto the pulley. The narrow belt 104 is also entrained around a pulley wheel 80 secured centrally to forward truck shaft 82 and is therefore adapted to drive forward drive wheel 20 of the skateboard. From there, the belt 104 passes upwardly and rearwardly across roller 108 located just under deck 12 (e.g. in groove 15) and then around springwheel 110 disposed between frame sides 30a and 30b toward the rear of the board. Springwheel 110 is mounted on shaft 112 between the frame sides and includes therewithin a pair of band springs attached to post 114. The band springs are coiled or wound up within the device causing wheel 110, and belt 104 attached thereto, to wind in a clockwise direction under spring tension. Spring tension devices of this type are well known and readily available.

Upon depression of pedal 36, for example with the rider's foot, rollers 48 urge cam members 66 in a counterclockwise direction as the rollers 48 move upwardly along the forward sides of the cam members. The rearward sides of the cam members urge rollers 62 rearwardly, driving the double rack for rotating pinions 98 in a counterclockwise direction and winding up belt 104 against the spring tension provided by springwheels 110. The pulley wheel 80, over which belt 104 passes, consequently rotates shaft 82 in a counterclockwise direction and the board moves forwardly. The overrunning clutch member 76 in the forward wheels 20 causes the wheels 20 to be thus driven. However, after the pedal 36 has been depressed and the skateboard continues to move in a forward direction, the overrunning clutch member 76 permits the forward wheels to continue to turn or free wheel without further actuation of the transmission means.

When the pedal is allowed to upraise, the springwheel 110 rotates in a clockwise direction and rewinds belt 104 and the double rack is driven forwardly by pinions 98 as the belt rewinds for returning the entire transmission mechanism to its original condition. Of course, the reverse direction of movement of belt 104 does not interfere with continued counterclockwise rotation of the wheels 20 because of the freewheeling action of the overrunning clutch mechanism.

The cam member 66 is constructed such that a variable response is produced during depression of the pedal 36 from the angularly upraised to the horizontal position, causing successively higher velocity of the skateboard. The pedal 36, upon approaching the bottom of the pedal stroke, moves rollers 48 closer to pivot 68 of cam member 66 and in so doing accomplishes increased velocity of movement of the cam member and of the double rack and therefore of the skateboard. The increased response is maximum as roller 48 reaches lobe 72 and thereafter. Greater speed output is thus provided during the lower portion of the pedal stroke whereby higher skateboard speeds can be reached and/or maintained during skateboard operation by simply allowing the pedal to raise a relatively small amount from the horizontal position, and repeatedly depressing the pedal through a shortened range of motion.

Figure 7:
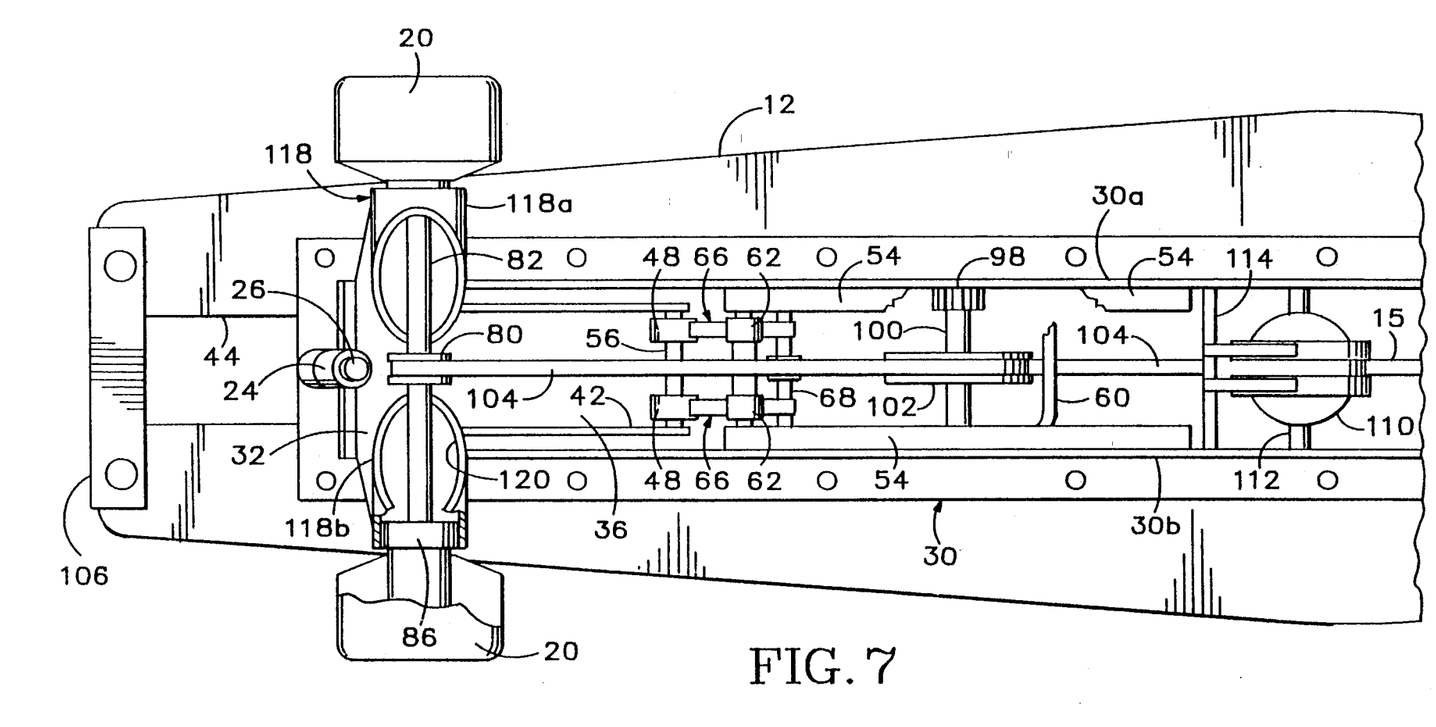
FIG. 7 is a partially broken away bottom view of the skateboard in accordance with the present invention.

It will be noted, particularly with reference to FIG. 7, that narrow drive belt 104 is centrally located laterally of the skateboard, i.e., in substantial coincidence with the centerline thereof, to drive pulley 80 which is affixed on shaft member 82 midway between wheels 20. The drive transmission mechanism does not interfere with the turning or the steering of the skateboard inasmuch as the narrow belt assumes substantially the same position for a turn in either direction or for straight ahead steering. To accommodate the central positioning of drive pulley 80, bearings 86 for shaft member 82 are disposed at opposite ends of a tubular housing 118 forming part of bifurcated bracket 32 that rotates with respect to stud 26. The tubular housing 118 is open downwardly, and actually comprises two end sections 118a and 118b located toward the side edges of the board and diagonally truncated inwardly to provide downwardly facing, elliptically shaped openings 120 through which the shaft member 82 and pulley 80 are accessed. (Each of the sections 118a and 118b is welded to, and comprises an integral part of, rotatable bracket 32.) Consequently, the forward steering truck is easily turned while at the same time drive pulley 80 is accessible to narrow drive belt 104.

It is further noted the skateboard according to the present invention is characterized by a low profile, wherein the propulsion transmission means is accommodated just under deck 12 and substantially within the height of conventional front and rear support wheel sets. Stability of the board is therefore retained, and the mechanism is efficient and uncomplicated. It is also noted that since the drive pedal 36 is located at the forward end of the skateboard, a much more stable operating stance can be assumed by the rider who can pump the pedal forwardly and downwardly without leaning back or urging himself in a rearward direction.

It will also be appreciated the improvements according to the present invention can be employed, e.g. as supplied in kit form, to modify an existing skateboard.

Figure 8:
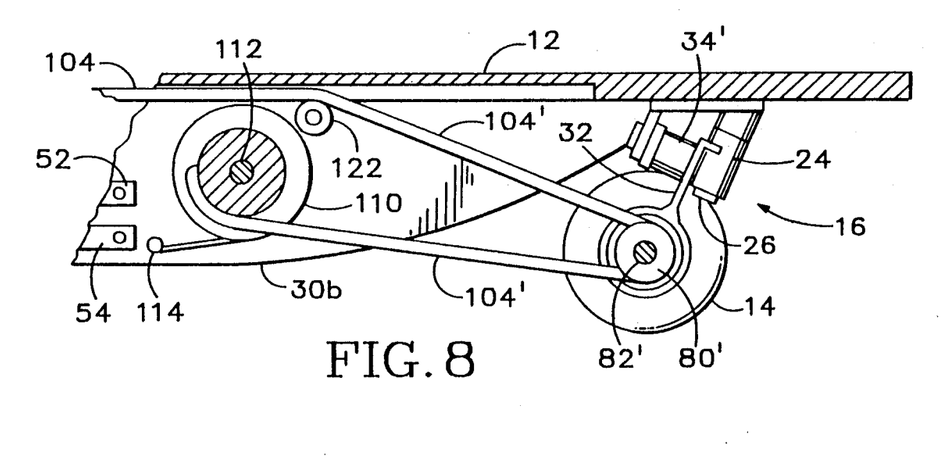
FIG. 8 is a partially broken away vertical cross section illustrating an alternative embodiment of the present invention having both front and rear driven wheels.

The rear truck 16 is suitably constructed in substantially the same manner as forward steering truck 22 except, of course, for the reversal in angle of the corresponding stud 26 and except that tubular housing 118 may be closed rather than open. However, according to an alternative embodiment of the present invention as depicted in FIG. 8, the rear wheels 14 may also be driven in which case the tubular housing 118 is downwardly open or split in the manner previously described for the front truck. Referring to FIG. 8, the narrow drive belt 104 proceeding rearwardly from roller 108, instead of passing immediately around springwheel 110, is entrained about a pulley 80' integrally mounted upon rear shaft member 82' after having passed over intermediate roller 122. After thus engaging pulley wheel 80' the belt 104' returns to springwheel 110. This last mentioned embodiment functions in substantially the manner as hereinbefore described except that both front and rear wheels are driven. Thus, when the pedal 36 is depressed, the double rack drives pinions 98 and rotates pulley wheel 102 causing the drive belt to be wrapped around the pulley wheel. At this time, the drive belt engages both the forward drive pulley 80 and the rearward drive pulley 80' for rotating both wheel sets 14 and 20 in counterclockwise directions. However, when the pedal 36 is upraised, or depression thereof is discontinued, both wheel sets 14 and 20 will tend to freewheel forwardly since both are provided with overrunning clutch means.

While preferred and alternative embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A skateboard comprising:
   an elongated deck;
   a pedal mounted to said deck and pivotable between a first ready position and a second depressed position;
   a plurality of wheels rotatably mounted to the underside of said deck for supporting said deck on a surface, including at least one drive wheel;
   transmission means interposed between said pedal and said drive wheel so that movement of said pedal from said pedal'first ready position to said depressed position drives said transmission means from a ready position to a driven position causing said drive wheel to rotate and move said skateboard along aid surface; and
   spring means for normally biasing said transmission means to its ready position when said pedal is not depressed;
   wherein said transmission means includes a camming member engaged in response to movement of said pedal so that, during the latter portion of a pedal stroke, increased velocity is imparted to said board; and wherein said camming member depends from a pivot and is engaged by a roller mounted to said pedal wherein said roller is urged closer to said pivot as said pedal is depressed, and including an operable connection between said camming member and said drive wheel, said camming member having a lobe engageable by said roller as said pedal is depressed and said roller draws closer to said pivot to increase the velocity of said drive wheel.

2. A skateboard in accordance with claim 1 wherein said operable connection between said camming member and said drive wheel comprises a substantially horizontal rack urged rearwardly by said camming member, a pinion driven by said rack, a first pulley axially attached to said pinion and a second pulley on the shaft of said drive wheel, and a narrow belt entrained around said first and second pulleys, said spring means being applied in tension to said belt.

3. A skateboard in accordance with claim 2 wherein said deck is provided with a longitudinal frame having vertical sides depending downwardly from said deck, and means for providing horizontal inwardly facing tracks on said vertical sides, said rack comprising spaced side members riding in said tracks.

4. A skateboard comprising:
an elongated deck;
a pedal pivotally mounted with respect to said deck and pivotable between a first ready position and a second depressed position;
a plurality of wheels rotatably mounted to the unerside of said deck for supporting said deck on a surface, including at least one drive wheel retaining a clutch bearing;
transmission means comprising a linearly reciprocable rack movable substantially horizontally with respect to said deck between a first ready position and a second driven position, said rack being operably engaged between said pedal and said at least one drive wheel such that movement of said pedal from said pedal's first ready position to said depressed position causes said drive wheel to rotate and move said skateboard along said surface; and
spring return means biasing said rack toward its ready position when said pedal is not depressed;
wherein said skateboard has a frame provided with a horizontal track and said rack includes at least one horizontally disposed member slideably within the track on said frame, said horizontally disposed member having an upwardly facing toothed portion, said transmission means further comprising:
a pinion rotatably mounted to said frame above said horizontally disposed member for engaging said toothed portion; and
a pulley rotatably mounted to said frame, said pulley having a driving connection with said drive wheel for propelling said drive wheel; and
wherein said horizontally disposed member is slideable in said track in response to depression of said pedal.

5. A skateboard in accordance with claim 4 wherein said pulley is operably connected to said drive wheel by means of a belt.

6. A skateboard in accordance with claim 5 wherein said drive wheel is provided with a pulley disposed centrally between the sides of said skateboard and wherein the last mentioned pulley is engaged by said belt.

7. A skateboard in accordance with claim 6 wherein said drive wheel is carried by a truck having a diagonal steering axis, said truck having a drive axle for turning said drive wheel and to which the last mentioned pulley is secured.

8. A skateboard comprising:
an elongated deck;
a pedal pivotally mounted with respect to said deck and pivotable between a first ready position and a second depressed position;
a plurality of wheels rotatably mounted to the underside of said deck for supporting said deck on a surface, including at least one drive wheel retaining a clutch bearing;
transmission means comprising a linearly reciprocable rack movable substantially horizontally with respect to said deck between a first ready position and a second driven position, said rack being operably engaged between said pedal and said at least one drive wheel such that movement of said pedal from said pedal's first ready position to said depressed position causes said drive wheel to rotate and move said skateboard along said surface; and
spring return means biasing said rack toward its ready position when said pedal is not depressed;
wherein the skateboard is steered by trucks having opposing diagonal steering axes.

9. A skateboard comprising:
an elongated deck;
a pedal pivotally mounted with respect to said deck and pivotable between a first ready position and a second depressed position;
a plurality of wheels rotatably mounted to the underside of said deck for supporting said deck on a surface, including at least one drive wheel retaining a clutch bearing;
transmission means comprising a linearly reciprocable rack movable substantially horizontally with respect to said deck between a first ready position and a second driven position, said rack being operably engaged between said pedal and said at least one drive wheel such that movement of said pedal from said pedal's first ready position to said depressed position causes said drive wheel to rotate and move said skateboard along said surface; and
spring return means biasing said rack toward its ready position when said pedal is not depressed;
wherein said transmission means includes a mechanical linkage including camming means as one of the links of said linkage, said camming means being engaged by a roller mounted to said pedal and engaging said rack for reciprocating the same.

10. The skateboard of claim 9 wherein said roller displaces said camming means as said roller rolls therealong and said camming means is shaped and positioned such that during the latter portion of a pedal stroke, increased velocity is imparted to said rack.

11. A skateboard comprising:
an elongated deck;
a pedal mounted to said deck and pivotable between a first ready position and a second depressed position;
a plurality of wheel rotatably mounted to the underside of said deck for supporting said deck on a surface, including at least one drive wheel;
transmission means interposed between said pedal and said drive wheel so that movement of said pedal from said pedal's first ready position to said depressed position drives said transmission means form a ready position to a driven position causing said drive wheel to rotate and move said skateboard along said surface;

spring means for normally biasing said transmission means to its ready position when said pedal is not depressed; and a shaft member for mounting a pair of said wheels including said drive wheel, said shaft member being provided with a drive pulley disposed centrally between the wheels of said pair;

said transmission means including a belt driven in response to movement of said pedal, said belt being entrained around said drive pulley for rotating said drive pulley and said drive wheel;

said skateboard further comprising a truck secured to the underside of said deck for supporting said pair of wheels, said truck having a diagonal steering axis so that it may be turned by shifting of weight on said board during operation thereof, said truck including a bifurcated bracket member mounting bearings for said shaft member on either side of said drive pulley in non-interfering relation with said belt.

12. A skateboard in accordance with claim 11 further comprising a second shaft member for mounting a second pair of said wheels proximate the opposite end of said board from the first mentioned pair of wheels, said second pair of wheels including at least one second drive wheel, and said second shaft member being provided with a second drive pulley for said second pair of wheels wherein said second drive pulley is disposed centrally between the wheels of said second pair, and wherein said belt is also entrained around said second drive pulley for rotating said second drive pulley and said second drive wheel.

13. A skateboard in accordance with claim 12 further comprising a second truck secured to the underside of the said deck for supporting said second pair of wheels, said second truck having a diagonal steering axis angled inwardly and downwardly toward the first mentioned truck, said second truck including a bifurcated bracket member mounting bearings for the second shaft member on either side of said second drive pulley in non-interfering relation with said belt.

14. A skateboard comprising:

an elongated deck;

a pedal mounted to said deck and pivotable between a first ready position and a second depressed position;

a plurality of wheels rotatably mounted to the underside of said deck for supporting said deck on a surface, including at least one drive wheel;

transmission means interposed between said pedal and said drive wheel so that movement of said pedal from said pedal's first ready position to said depressed position drives said transmission means from a ready position to a driven position causing said drive wheel to rotate and move said skateboard along said surface; and spring means for normally biasing said transmission means to its ready position when said pedal is not depressed;

wherein said transmission means includes a camming member and a roller movable therealong in response to movement of said pedal so that, during the latter portion of a pedal stroke, increased velocity is imparted to said board.

* * * * *